US008061618B2

(12) United States Patent
Mosteller

(10) Patent No.: US 8,061,618 B2
(45) Date of Patent: Nov. 22, 2011

(54) MULTI-LAYER CARDS WITH AESTHETIC FEATURES AND RELATED METHODS OF MANUFACTURING

(75) Inventor: Barry Mosteller, Downingtown, PA (US)

(73) Assignee: Oberthur Card Systems SA, Paris (FR)

( * ) Notice: Subject to any disclaimer, the term of this patent is extended or adjusted under 35 U.S.C. 154(b) by 883 days.

(21) Appl. No.: 11/659,765

(22) PCT Filed: Aug. 9, 2004

(86) PCT No.: PCT/US2004/025611

§ 371 (c)(1), (2), (4) Date: Jan. 25, 2008

(87) PCT Pub. No.: WO2006/022695

PCT Pub. Date: Mar. 2, 2006

(65) Prior Publication Data

US 2008/0245865 A1 Oct. 9, 2008

(51) Int. Cl.
*G06K 19/02* (2006.01)

(52) U.S. Cl. ........................................ 235/488; 235/492

(58) Field of Classification Search .................. 235/488, 235/492, 486, 483, 449
See application file for complete search history.

(56) References Cited

U.S. PATENT DOCUMENTS

| | | | | |
|---|---|---|---|---|
| 5,671,525 | A * | 9/1997 | Fidalgo | 29/600 |
| 6,082,778 | A | 7/2000 | Solmsdorf | 283/82 |
| 6,764,014 | B2 * | 7/2004 | Lasch et al. | 235/487 |
| 6,841,238 | B2 * | 1/2005 | Argoitia et al. | 428/323 |
| 6,888,442 | B1 * | 5/2005 | O'Reilly et al. | 340/5.2 |
| 7,374,107 | B2 * | 5/2008 | Bertrand | 235/492 |
| 2002/0182383 | A1 * | 12/2002 | Phillips et al. | 428/199 |
| 2003/0190473 | A1 * | 10/2003 | Argoitia et al. | 428/403 |
| 2007/0069038 | A1 * | 3/2007 | Bertrand | 235/492 |

FOREIGN PATENT DOCUMENTS

| | | |
|---|---|---|
| DE | 196 29 335 | 1/1998 |
| EP | 0 678 400 | 10/1992 |
| GB | 2 338 678 | 12/1999 |
| GB | 2 338 680 | 12/1999 |
| WO | WO 98/03350 | 1/1998 |

* cited by examiner

*Primary Examiner* — Thien M Le
(74) *Attorney, Agent, or Firm* — K&L Gates LLP

(57) ABSTRACT

Multi-layer cards with aesthetic and/or functional features, e.g. banking, access, or identification cards, having a bearing layer that includes an effects layer disposed directly between two core layers are disclosed herein. Among other potential benefits, the layered structure of the bearing layer reduces overall manufacturing costs, as compared to methods known in the art, by facilitating a balanced card construction while minimizing the number of layers formed from relatively expensive materials, avoiding direct imaging of the effects layer and minimizing waste associated therewith, as well as providing for reliable incorporation of the effects layer into the multi-layered structure with minimal expenditure of resources and reduced possibility of waste.

22 Claims, 2 Drawing Sheets

MULTI-LAYER CARDS WITH AESTHETIC FEATURES AND RELATED METHODS OF MANUFACTURING

CROSS-REFERENCE TO RELATED APPLICATION

This application is the national phase of International (PCT) Patent Application Serial No. PCT/US2004/025611, filed on Aug. 9, 2004, the disclosure of which is incorporated by reference herein.

FIELD OF THE INVENTION

The present invention relates generally to multi-layer cards and, more specifically, to laminated banking, access, or identification cards having aesthetic and/or functional features embedded therein.

BACKGROUND OF THE INVENTION

The use of secure cards, for example, for processing of financial transactions, enabling secure network access, providing fast and reliable verification of a bearer's identity, and other purposes has become widespread. One example of such secure card is a card with a magnetic strip having a issuer-identifying code, user-identifying code, cipher data and the like, recorded thereon and readable by automated means. Furthermore, driven by the ever growing need for secure financial transactions, as well as more complex operations—combining, for example, payment and secure network access—conventional magnetic stripe cards are increasingly being phased out and replaced by so-called "smart cards," i.e. laminated cards incorporating an integrated circuit or chip. The integrated circuit or chip typically includes a rewritable memory, and is configured to be energized by an external power supply and to exchange data with an external terminal when the card is inserted in the terminal. One non-limiting example of such smart card is described in U.S. Pat. No. 4,105,156, the disclosure of which is incorporated by reference herein.

Often, in addition to providing a banking card, access card, identification card, and the like with a magnetic stripe and/or chip for security purposes, as an additional security feature to hinder counterfeiters, such cards are also provided with a holographic image because such images are difficult to copy successfully. In addition, a hologram can be combined with a magnetic stripe for enhanced security, as described in U.S. Pat. No. 4,684,795, the disclosure of which is incorporated by reference herein.

As the secure card technology continues to gain momentum and card issuers seek to use its potential by delivering sophisticated solutions to establish closely tailored customer relationships, there is a strong demand for more attractive and distinctive cards that are aesthetically appealing to customers, as well as more effectively identify card issuers and promote their services.

Card manufacturers are responding to this demand by incorporating various visual effect layers, such as a metal foil layer, into the laminated card structure. Such a structure typically includes a core layer and at least one additional layer bonded thereto. U.S. Pat. No. 6,471,128 entitled "Method of Making a Foil Faced Financial Transaction Card Having Graphics Printed Thereon and Card Made Thereby," incorporated by reference herein, demonstrates one such method of producing a laminated financial transaction card.

Known methods for manufacturing laminated cards having metal layers, such as, for example, split core process and the solid core process, suffer from several drawbacks. For example, as further explained below, these methods may result in a waste of expensive components and often require special safety precautions to address hazardous conditions inherent therein.

In particular, in a split-core process, a polymer-backed foil sheet, typically a metal layer bonded to a polyethylene terephthalate ("PET") layer disposed over a polyvinylchloride ("PVC") layer, is used as one of the core layers of the card. In order to balance the card and prevent undesirable warping induced by thermal expansion during subsequent steps of the manufacturing process, a layer of the same material as the backing layer of the foil sheet preferably is used as the other core layer of the card. In contrast, in the solid core process, the foil sheet is bonded to one surface of a solid opaque core. However, as in the split-core process described above, to balance the card and prevent warping, a layer of the same material as the backing layer of the foil sheet preferably is bonded to the other surface of the core. In both of these methods, costs of the materials can be rather substantial, and as a result, such cards are typically several times more expensive to manufacture than conventional cards. Using more rigid and less expensive materials, such as polyvinylchloride ("PVC") instead of the material of the backing layer of the foil sheet may reduce the materials cost, but also increases the probability of warping and resulting waste.

Furthermore, in the methods described above, imaging, i.e., creating graphic images and/or alpha-numerical symbols, is carried out on relatively expensive materials, i.e., the metal layer of the foil sheet having an additional image receptive coating thereon and/or the backing layer of the foil sheet, e.g. PET. Imaging on expensive materials is undesirable given the substantial amount of waste typically involved in the imaging process.

Also, certain aspects of known methods for manufacturing laminated cards with metal layers may be hazardous and require proper precautions. For example, if a solvent silk-screen press is used to create images on the foil sheets, there is substantial risk of curling stock in the hot air dryer, which may result in equipment jams, and worse yet, fires caused by the backup of the foil sheets in the dryer. Finally, in order to have aesthetic and/or functional features visible from both sides of the card, it is known to include metal layers on both sides of the polymer core. Because such structures include two conductors in the form of two metal layers that are separated by a polymer insulator, they may operate as capacitors accumulating a static charge each time the card is used. Potential electrostatic discharge from these cards may damage the processing equipment Thus, there remains a need in the art for multi-layer secure cards, e.g., banking, access, or identification cards, that include aesthetic and/or functional features to satisfy the demands of the card issuers, while being less expensive and safer to manufacture.

SUMMARY OF THE INVENTION

It is an object of the present invention to provide a multi-layer card with aesthetic and/or functional features and methods of manufacturing thereof that overcome disadvantages of the methods known in the art.

It is another object of the present invention to provide a method of manufacturing a multi-layer card with aesthetic and/or functional features that achieves a balanced card construction while minimizing the number of layers formed from relatively expensive materials.

It is yet another object of the present invention to provide a method of manufacturing a multi-layer card having a metal layer that is easily incorporated into the card structure during the lamination process with minimal expenditure of resources and reduced possibility of waste.

It is still another object of the present invention to provide a method of manufacturing a multi-layer card with aesthetic and/or functional features that avoids creating an image on the expensive components of the card structure, such as, for example, a metal layer.

It is a further object of the present invention to provide a method of manufacturing a multi-layer card that may have aesthetic and/or functional features visible from both sides thereof while avoiding undesirable capacitor effects in the laminated structure.

Accordingly, a multi-layer secure card, e.g., banking, access, or identification card, having aesthetic and/or functional features that includes an effects layer disposed directly between two core layers is disclosed herein.

In general, in one aspect, the invention features a multi-layer card having a substantially flexible bearing layer. The bearing layer includes a first core layer, a second core layer, and an effects layer disposed directly between the first core layer and the second core layer. The thickness of the bearing layer may be less than 10 mils, for example, from about 7 mils to about 9 mils. The first core layer and the second core layer may be substantially transparent and fabricated of a polymer, such as polyester, glycolised polyester, or polyvinylchloride. In various embodiments, the first core layer and the second core layer are adhesively attached to the effects layer.

In some embodiments, the effects layer includes a substrate having a first surface and a first material deposited over the first surface. The effects layer may also include at least one holographic image. The thickness of the effects layer may range from about 1 mil to about 2 mils. The substrate may be substantially transparent, and may be fabricated of, for example, polyethylene terephthalate or polycarbonate. The first material may be a metal or a metal alloy, such as aluminum, copper, tin, or combinations thereof. The first material may also be a nonmetallic compound, for example, a metal oxide, metal nitride, metal carbide, metal oxynitride, metal oxyboride, or combinations thereof. The first material may be vacuum coated over the first surface of the substrate.

In other embodiments, the effects layer may include a plurality of woven fibers of a second material, such as PVC-coated nylon, metal, metal alloy, or carbon; at least one distinctive pattern, for example, an embossed three-dimensional pattern; and/or a reinforcing material.

In various embodiments, an outer layer is disposed over at least one of the first core layer and the second core layer. The outer layer may be substantially transparent, and may have a thickness of about 9 mils. The outer layer may be fabricated of a polymer, for example, polyester, glycolised polyester, and polyvinylchloride. A graphic image, a numerical symbol, or a text symbol may be created, for example, by printing on at least one surface of the outer layer. A substantially transparent protective layer then may be disposed over at least one of a graphic image, a numerical symbol, or a text symbol. This protective layer may have a thickness of about 2 mils, and may be fabricated from polyvinylchloride. In other embodiments, a magnetizable layer may be disposed over the outer layers. In some embodiments, at least one integrated circuit may be embedded within the card, for example, incorporated between the bearing layer and the outer layer, or between the outer layer and the protective layer.

In another aspect, the invention features a method of manufacturing a multi-layer card, which includes the steps of providing an effects layer and positioning the effects layer directly between a first substantially flexible core layer and a substantially flexible second core layer, to form a substantially flexible bearing layer.

In one embodiment, the effects layer is fabricated by providing a substrate having a first surface and depositing a first material over the first surface of the substrate. This first material may be fabricated of a metal, a metal alloy, or a nonmetallic compound, and it may be deposited over the first surface of the substrate using vacuum coating.

In certain embodiments, an adhesive may be applied to a surface of the first core layer and a surface of the second core layer such that the effects layer may then be inserted substantially simultaneously between the first core layer and the second core layer and laminated between them using at least one roller. The adhesive may be a transparent polyester-based material.

In other embodiments, an outer layer is provided and at least one of a graphic image, a numerical symbol, or a text symbol is then created, for example, printed, on at least one surface of the outer layer. In certain versions of these embodiments, the outer layer can be adhesively attached to the bearing layer after a graphic image, a numerical symbol, or a text symbol is created on the surface of the outer layer. A protective layer may then be provided over the at least one of a graphic image, a numerical symbol, or a text symbol on the outer layer.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention.

DETAILED DESCRIPTION OF THE PREFERRED EMBODIMENTS

A key aspect of the present invention involves the manufacturing of multi-layer cards with aesthetic and/or functional features, for example, banking, access, or identification cards, that include a bearing layer formed by an effects layer disposed directly between two core layers. Among other potential benefits, various embodiments of the invention lead to reducing overall manufacturing costs, as compared to methods known in the art, by (i) facilitating a balanced card construction while minimizing the number of layers formed from relatively expensive materials, and (ii) avoiding direct imaging of the effects layer and minimizing waste associated therewith. In addition, enclosing the effects layer between two core layers simplifies further processing of the card and facilitates reliable incorporation of the effects layer into the multi-layered structure with minimal expenditure of resources and reduced possibility of waste.

Figure 1A:
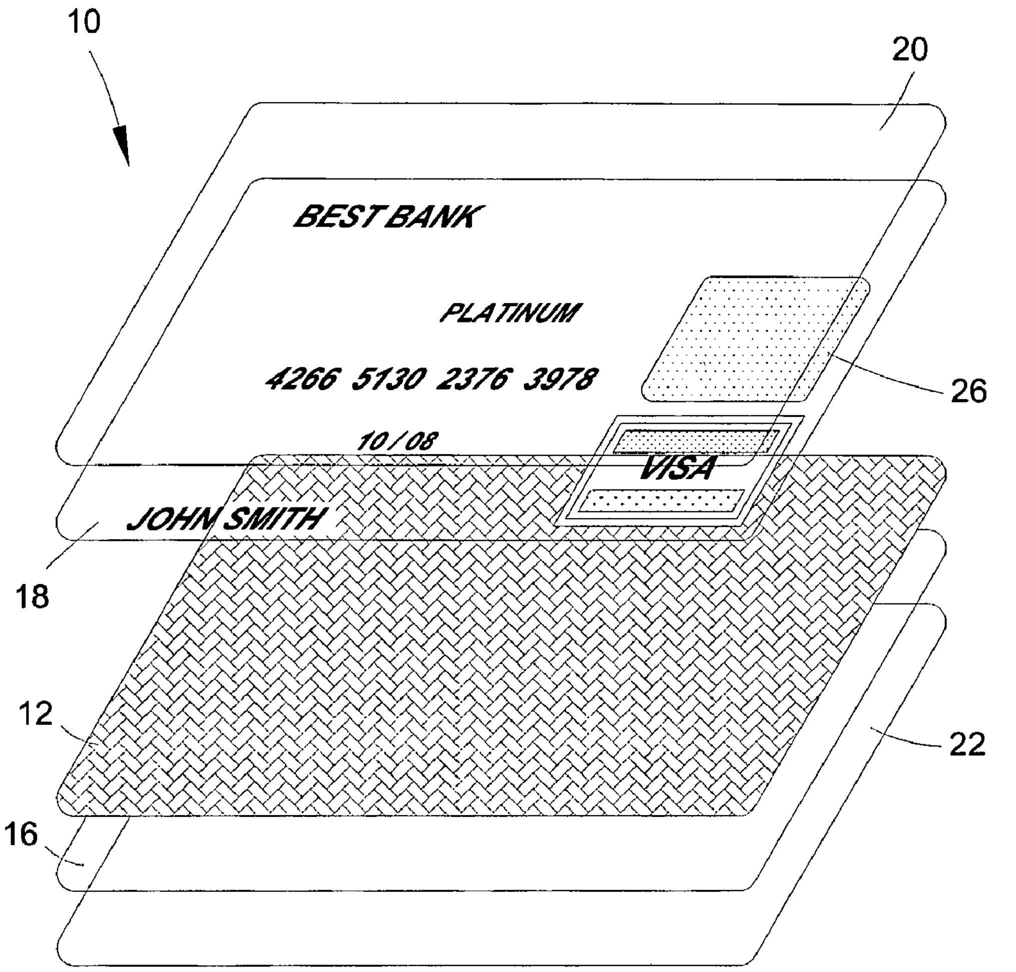
FIG. 1A is an exploded perspective view of one illustrative embodiment of a multi-layer card having a bearing layer according to various embodiments of the invention.
Figure 1B:
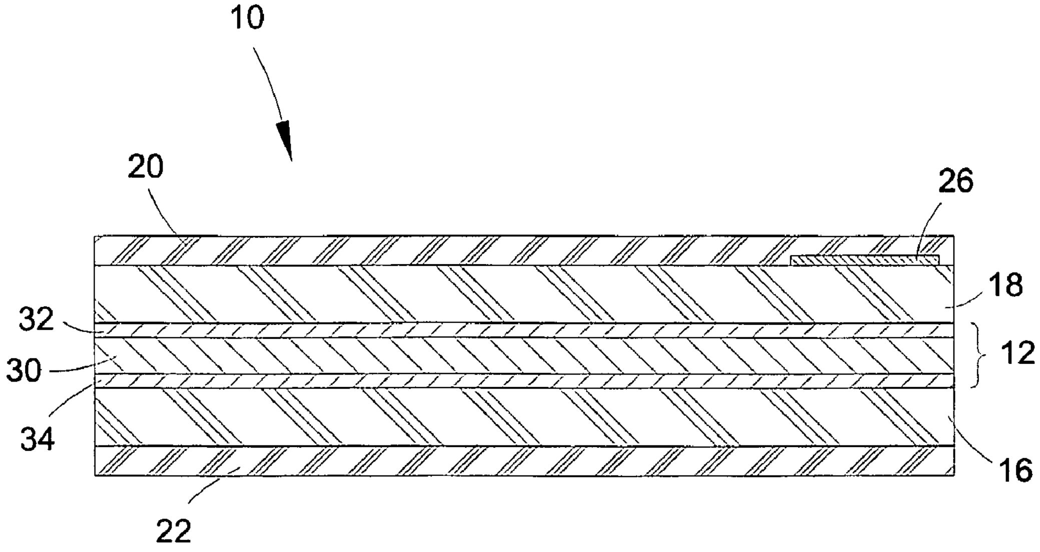
FIG. 1B is a cross-sectional view of the card of FIG. 1A.

Throughout the description, where compositions are described as having, including, or comprising specific components, or where processes are described as having, including, or comprising specific process steps, it is contemplated that compositions of the present invention also consist essentially of, or consist of, the recited components, and that the processes of the present invention also consist essentially of, or consist of, the recited processing steps. It should be understood that the order of steps or order for performing certain actions are immaterial so long as the invention remains operable. Moreover, two or more steps or actions may be conducted simultaneously FIG. 1A-1B depict an illustrative embodiment of a multi-layer card 10. The card 10 includes a bearing layer 12, outer layers 16, 18, and protective layers 20, 22, as described in more detail below. A number of aesthetic and functional features may be incorporated into the multi-layer card 10 in order to meet the demands of card-issuing entities. In one embodiment, as shown in FIGS. 1A-1B, the card 10 includes an effects layer 30 embedded into the bearing layer 12, as well as a hologram 26 disposed over the outer layer 18. Preferably, the card 10 meets the ANSI/ISO specifications for the characteristics of a banking card requiring the component layers of material that form the card structure possessing a minimum peel strength of 0.35 N/mm (2 lbf/in). In accordance with the ANSI/ISO specifications, in illustrative embodiments, the planar dimensions of the card 10 are either 3.375"×2.125" (85.6 mm×54 mm), 3.63"×2.37" (92 mm×60 mm), or 3.88"×2.63" (98.5 mm×67 mm). Also, the thickness of the card 10 is about 0.030" with tolerances of +/−0.003" (30 mils+/−3 mils).

Figure 2A:
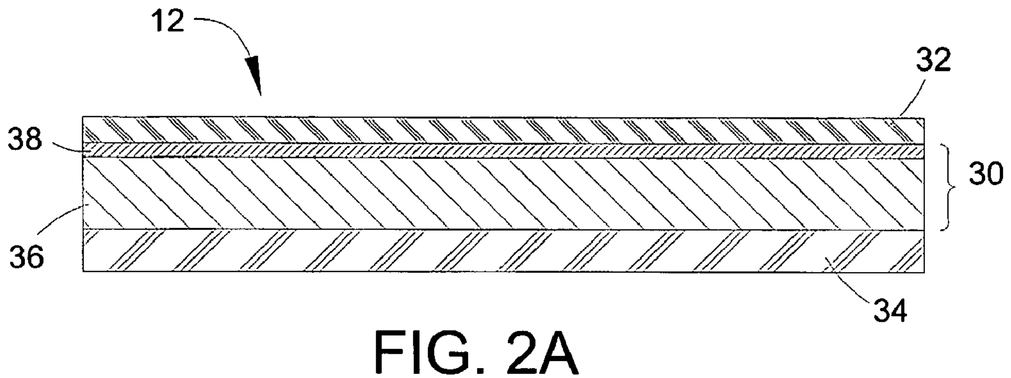
FIGS. 2A-2C are cross-sectional views of the bearing layer of the multi-layer card depicted in FIGS. 1A-1B, according to different embodiments of the invention.

Referring to FIG. 2A, the bearing layer 12 includes an effects layer 30, a first core layer 32, and a second core layer 34. As mentioned above, one important advantage of the invention, as compared to methods known in the art, is avoiding direct imaging of the effects layer 30 and minimizing waste associated therewith. Instead, as will be explained in more detail below, in various embodiments, desired graphic images and/or alpha-numerical symbols are created on the outer layers 16, 18 shown in FIGS. 1A-1B. In some embodiments, such imaging is carried out prior to attaching the outer layers 16, 18 to the bearing layer 12. In such an embodiment, each of the outer layers 16, 18 is sufficiently thick to allow for efficient handling and processing thereof during the imaging stage. In one version of this embodiment, the thickness of each of the outer layers 16, 18 is about 7 mils. Thus, because the total thickness of the card 10 may not exceed about 30 mils, in accordance with the ANSI/ISO specifications, in various versions of this embodiment, the thickness of the bearing layer 12 is less than 10 mils, for example, ranging from about 7 mils to about 9 mils. In a particular version, the thickness of the bearing layer 12 ranges from 7.2 mils to 8.8 mils.

In various embodiments, the thickness of the effects layer 30 may range from about 1 mil to about 2 mils, with the thickness of each of the first core layer 32 and the second core layer 34 being about 3 mils. In some embodiments, the effects layer 30 is slightly shifted off center in the bearing layer, for example, by less than 3 mils, by varying the relative thickness of the first core layer 32 and the second core layer 34 without increasing, however, the overall thickness of the bearing layer 12. For example, in one embodiment, the thickness of the first core layer 32 is 2 mils and the thickness of the second core layer 34 is 4 mils.

Still referring to FIG. 2A, in some embodiments, the effects layer 30 includes a substrate 36 having an effect-generating material 38 deposited there over. In one embodiment, the substrate 36 is substantially flexible. In various versions of this embodiment, the substrate 36 is formed from a flexible polymer, such as polyethylene terephthalate or polycarbonate. Other materials such as polyvinylchloride or polyester can also be used. Depending on the desired appearance of the effects layer, the substrate 36 can be substantially transparent, translucent, or opaque.

Figure 2B:
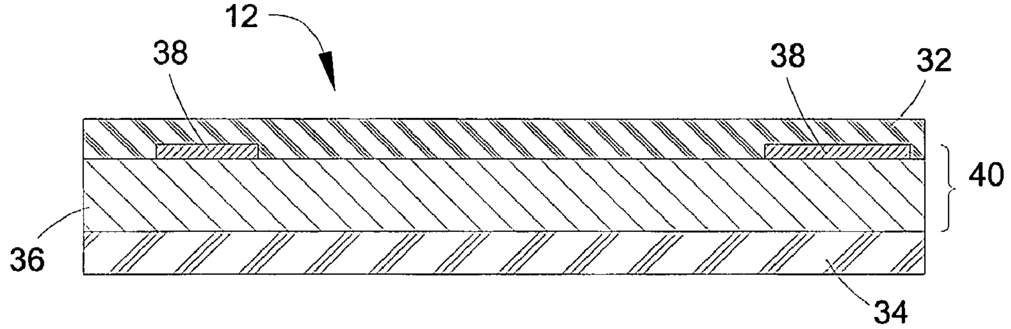

In some embodiments of the invention, the effect-generating material 38 is a metal, metal alloy, or a nonmetallic compound deposited over the substrate 36 using any of deposition processes known in the art. In a particular embodiment, the effect-generating material 38 is vacuum-coated over the substrate 36. Other deposition methods known in the art, such as sputtering or plasma spraying, can also be used. In one version of this embodiment, the effect-generating material 38 is aluminum, copper, tin, or any combinations thereof. In another version, the material 38 is a nonmetallic compound, for example, a metal oxide, metal nitride, metal carbide, metal oxynitride, metal oxyboride, or any combinations thereof. Instead of or in addition to the effects layer 30, the bearing layer 12 may include an auxiliary effects layer having at least one holographic image. Referring to FIG. 2B, in one embodiment, after the effect-generating metal or metal alloy 38 is deposited over the substrate 36, at least one holographic image is created using methods known in the art. Then, a mask is applied to the resulting layer such that one or more holographic images and the alignment markings are covered by the mask while the remaining area of the layer is exposed. Then, the metal or metal alloy 38 in the exposed area is removed, for example, etched away using any of etching solutions known in the art depending on the choice of the metal 38. For example, ferric chloride can be used as etching solution for copper. Thusly processed the effects layer 40 having one or more holographic images thereon is enclosed between the core layers 32, 34, as described in more detail below.

Figure 2C:
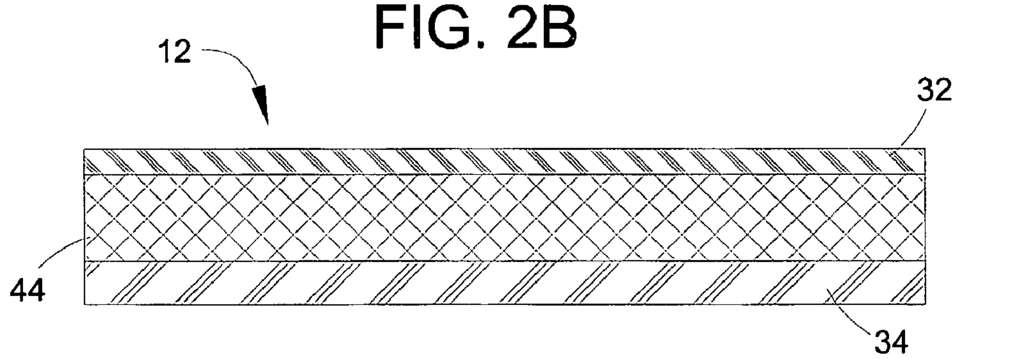

Referring to FIG. 2C, in some embodiments, to impart desired aesthetic appearance to the card 10, instead of or in addition to the effects layer 30, the bearing layer 12 includes an effects layer 42 that is a self-supporting layer of an effect-generating material 44 enclosed between the core layers 32, 34 without a substrate. In one embodiment, such layer of effect-generating material 44 is a thin milled metal foil, for example, aluminum or copper foil. In another embodiment, the layer of effect-generating material 44 is a plurality of woven fibers, such as PVC-coated nylon fibers or other fabric. Other suitable examples of the effect-generating material 44 include a thin film having a desired appearance, for example, a dyed and/or scribed polymer film or a metal-plated film. The effect-generating material 44 may include a reinforcing material, such as metal or carbon fibers. In yet another embodiment, the layer of the effect-generating material 44 may have a three-dimensional pattern, for example, an embossed pattern.

In various embodiments, the first core layer 32 and the second core layer 34 may be adhesively attached to both surfaces of the effects layer 30. The first core layer 32 and the second core layer 34 may be substantially flexible, and may be composed of a polymer, such as polyester, glycolised polyester, and polyvinylchloride. At least one of the first core layer 32 and the second core layer 34 may be substantially transparent or translucent so that the aesthetic features of the effects layer are visible. The adhesive may be applied on a surface of the first core layer 32 and on a surface of the second core layer 34 to a thickness of about 0.5 mil. The adhesive may be any transparent, translucent, or opaque polyester-based bonding material known in the art. In a particular embodiment of the invention, the adhesive is completely transparent so as not to interfere with or occlude the aesthetic features of the effects layer.

Figure 3:
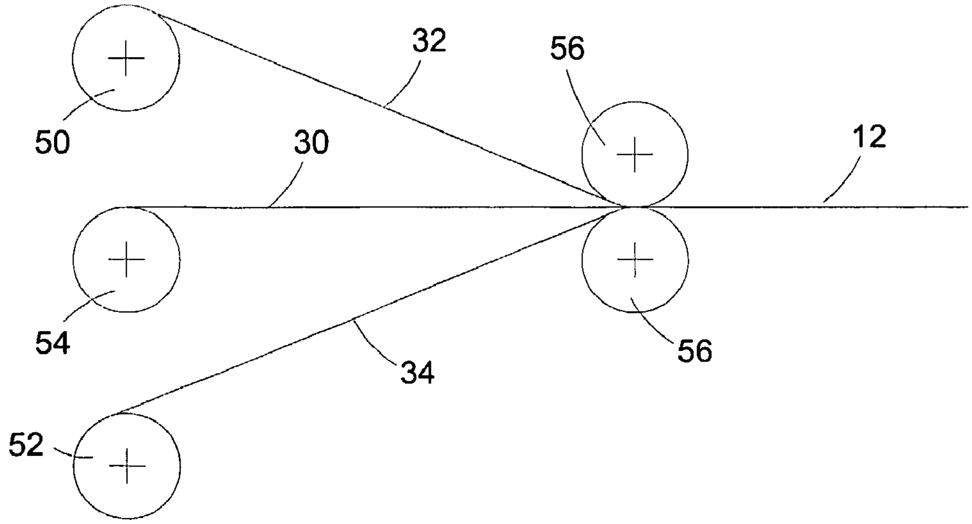
FIG. 3 is a schematic view of a method for manufacturing of the multi-layer card depicted in FIGS. 1A-1B, according to one embodiment of the invention.

Referring to FIG. 3, in a particular embodiment, in order to avoid excessive handling of the effects layer and increase efficiency of the process, the first core layer 32, the second core layer 34, and the effect layer 30 positioned there between are dispatched from feed off rolls 50, 52, and 54, respectively, and caused to pass between a pair of hot nip rollers 56, whereby the effects layer 30 is laminated between the first core layer 32 and the second core layer 34. Thusly created bearing layer 12 is then cut into sheets of desired size and used in further manufacturing steps. In this embodiment, sheets of the bearing layer 12 are easy to handle in the manufacturing process, such as, for example, a conventional press lamination process. Also, the effects layer 30 is protected between the core layers 34, 36 at all times during manufacturing so that the desired appearance is not compromised and a possibility of waste is reduced. Notably, because the effect layer is centrally disposed the structure of the card is balanced and the possibility of warping is reduced. In various embodiments, a conventional press lamination process is then utilized to melt the materials of the core layers together, further improve the nip roller bonds to the effect layer, and to provide press polish and/or impart a desired finish to the surface of the card. Other lamination methods known in the art, for example, lamination between two polished stainless steel plates, described in more detail below, can also be used In various embodiments, at least one of the outer layers 16, 18 may be disposed over the core layers 32, 34, for example, adhesively attached thereto. Referring again to FIG. 1B, in a particular embodiment, the outer layer 16 is disposed over the first core layer 32 and the outer layer 18 is disposed over the second core layer 34. The outer layers 16, 18 may be fabricated of a polymer, such as a polyester, glycolised polyester, or polyvinylchloride, and may be substantially transparent, translucent, or opaque. In one embodiment, the outer layer 16 disposed over the first core layer 32 may be substantially transparent or translucent, and the outer layer 18 disposed over the second core layer 34 may be opaque, so that the aesthetic effects imparted by the effects layer 30 are visible from one side only. In another embodiment, both outer layers are substantially transparent or translucent, so that both sides of the effects layer 30 are visible.

As mentioned above, one advantage of the invention as compared to methods known in the art, is avoiding direct imaging of the effects layer 30 and minimizing waste associated therewith. Instead, in various embodiments, desired graphic images and/or alpha-numerical symbols are created on the outer layers 16, 18, either before or after attachment thereof to the bearing layer 12. In the embodiment where the imaging is implemented prior to attaching the outer layers 16, 18 to the bearing layer 12, each of the outer layers 16, 18 is sufficiently thick to allow for efficient handling and processing thereof during the imaging stage. The thickness of the layers 16, 18 is determined, at least in part, by considerations of undesirable electrostatic effects, known to skilled artisans. In some versions of this embodiment, the thickness of each of the outer layers 16, 18 ranges from about 7 mils to about 9 mils.

In some embodiments, the outer layers 16, 18 may be tacked to the bearing layer 12 using heat from a heat welder, and then laminated together with the bearing layer 12 in a laminator. In one embodiment, during lamination, the tacked layers may first be placed between two polished stainless steel plates. A quarter-inch thick aluminum tray, called a "book," holds ten of the tacked layers between stainless steel plates, one on top of another. There may be a pad on the outside of the bottom set, and a pad on the top of the top set to aid in providing even pressure. A stainless steel plate may be placed on the outside of each pad to allow a solid surface to apply pressure to the book. The laminators have multiple stations, for example, four stations, and may hold either four or twelve books. The first station may be a loading/unloading/holding station to remove laminated sheets, put tacked sheets in the books, and hold the books in queue until the next cycle. The second station may be for heating, using a circulation of hot oil. Each book may be loaded between two parallel plates that are heated to about 300° Fahrenheit and that apply pressure to the books. A low-pressure short hold time may be used to get all the air out of the layers, and a high-pressure long hold may be used to allow the plastic to reach about 285° F. At this temperature and pressure, the layers are soft enough to melt and become one piece. The third station may be for chilling the hot books with water. Once the sheets return to room temperature and solidify, they may be returned to the first station for unloading.

As mentioned above, desired graphic images and/or alpha-numerical symbols are created on the outer layers 16, 18, either before or after attachment thereof to the bearing layer 12. In the embodiments where imaging is carried out before lamination, either top (i.e. outward facing) or bottom (i.e. bearing layer facing) surface of the outer layers 16, 18 can be imaged to create a desired appearance. Specifically, imaging only the top surface of the outer layers 16, 18 may make the effects layer 30 appears to be below the image layer. Conversely, imaging only on the bottom surface of the outer layers 16, 18 may make the effects layer 30 appear to be on the same level as the image layer. In one embodiment, imaging is carried out on both the top surface and the bottom surface of the outer layer 16 thereby enabling viewers to distinguish three different layers, the two image planes of the outer layer 16 and the effects layer 30. In another embodiment, each layer of the card 10 is either transparent or translucent, and imaging is carried out on both the top surface and the bottom surface of both outer layers 16, 18 thereby enabling viewers to distinguish five different layers, the four image planes and the effects layer.

Imaging provided within the card structure may take the form of a graphic image, a numerical symbol, or a text symbol. Non-limiting examples of the information that can be provided on, for example, a credit card, includes, but is not limited to, bank information, including a logo; type of card, e.g., Platinum, Gold, Debit, Business, and Corporate; card number; brand of the card, e.g., VISA™, MASTERCARD™, DISCOVER™, and AMERICAN EXPRESS™; and/or name of the card holder. Imaging may be provided by any of the methods known in the art, including offset and silkscreen printing Offset printing and silkscreen printing may be used to apply graphic images, numerical symbols, or text symbols to the outer layers. Standard inks are used in the offset presses, for example, a two-color press, a six-color press, or a two-color UV ink press. Silkscreen inks are used in the silkscreen press, which typically has a thicker ink layer than the offset presses. The silkscreen inks may have larger solid particles, and therefore, are typically higher quality metallic inks. Clear coats or adhesive coats may be added during the printing process to improve the appearance or provide better adhesion of the inks.

Referring again to FIG. 1B, a substantially transparent or translucent protective layers 20, 22 may be disposed over wholly or partially at least one of the outer layers 16, 18, for example, at least over the at least one of a graphic image, a numerical symbol, or a text symbol. The protective layers may be fabricated of PVC, and may have a thickness of about 2 mils. In some embodiments, the protective layers may be applied using a platen press under controlled conditions of temperature, pressure and time. In some embodiments, a varnish compound or other coating known in the art can be applied instead of or in addition to the PVC layer. Thusly created multi-layer card can also be further processed following any of the methods known in art, such as being punched like PVC cards, hot stamped with holograms and/or decorative hot stamps, signature panels and magnetic stripes can be applied, contacts and smart card chips can be embedded, full personalization can be completed, conversion to other form factors are possible such as GSM breakouts, VISA or MasterCard shape card breakouts, post lamination printing etc. For example, in various embodiments, a signature panel (not shown) can be applied to one of the outer layers 16, 18 using hot stamping processes known in the art, wherein a hot metal head activates the glue on the back of the signature panel thereby releasing it to the attachment site. In another embodiment, a magnetizable layer is disposed over one of the outer layers 16, 18 proximate to the signature panel using hot rollers. Also, in some embodiments, an integrated circuit (not shown) is embedded in the multi-layer structure of the card 10, for example, disposed between the bearing layer 12 and one of the outer layer 16, 18, as described in more detail in U.S. Pat. No. 6,513,718, the disclosure of which is incorporated by reference herein.

While the invention has been particularly shown and described with reference to specific illustrative embodiments, it should be understood that various changes in form and detail may be made without departing from the spirit and scope of the invention as defined by the appended claims.

The invention claimed is:

1. A multi-layer card that meets ASO/ISO specifications, the multi-layer card comprising a bearing layer, the bearing layer comprising:

(a) a first core layer, wherein the first core layer is transparent or translucent;

(b) a second core layer; and (c) a visible effects layer disposed directly between the first core layer and the second core layer, wherein the visible effects layer comprises:

(i) a transparent or translucent substrate having a first surface; and (ii) a visible first material deposited over the first surface;

wherein the multi-layer card further comprises an outer layer disposed over the transparent or translucent first core layer, the outer layer being substantially transparent and comprising at least one of a graphic image, a numerical symbol, and a text symbol created on at least one of its top surface and its bottom surface, and wherein the visible effects layer appears to be either below and/or on the same level as the graphic image, the numerical symbol and/or the text symbol.

2. The multi-layer card of claim 1, wherein the substrate comprises a polymer selected from the group consisting of polyethylene terephthalate and polycarbonate.

3. The multi-layer card of claim 1, wherein the first material is vacuum coated over the first surface of the substrate.

4. The multi-layer card of claim 1, wherein the first material comprises a metal selected from the group consisting of aluminum, copper, tin, and combinations thereof.

5. The multi-layer card of claim 4, wherein the effects layer comprises one or more holographic images created by etching away some of the metal of the first material.

6. The multi-layer card of claim 1, wherein the first material comprises a nonmetallic compound selected from the group consisting of metal oxides, metal nitrides, metal carbides, metal oxynitrides, metal oxyborides, and combinations thereof.

7. The multi-layer card of claim 1, wherein the effects layer comprises at least one holographic image.

8. The multi-layer card of claim 1, wherein the effects layer comprises a plurality of woven fibers comprising a second material.

9. The multi-layer of claim 8, wherein the second material comprises nylon coated with polyvinylchloride.

10. The multi-layer card of claim 1, wherein the bearing layer has a thickness of less than 10 mils.

11. The multi-layer card of claim 1, wherein the bearing layer has a thickness ranging from about 7 mils to about 9 mils.

12. The multi-layer card of claim 1, wherein the effects layer has a thickness ranging from about 1 mil to about 2 mils.

13. The multi-layer card of claim 1, wherein at least one of the first core layer and the second core layer comprises a polymer selected from the group consisting of polyester, glycolised polyester, and polyvinylchloride.

14. The multi-layer card of claim 1, wherein the outer layer comprises a polymer selected from the group consisting of polyester, glycolised polyester, and polyvinylchloride.

15. The multi-layer card of claim 1, wherein the outer layer has a thickness of about 9 mils.

16. The multi-layer card of claim 1, further comprising a substantially transparent protective layer disposed at least over the graphic image, the numerical symbol, and/or the text symbol.

17. The multi-layer card of claim 16, wherein the protective layer comprises polyvinylchloride.

18. The multi-layer card of claim 1, further comprising a magnetizable layer disposed over the outer layer.

19. The multi-layer card of claim 1, further comprising at least one integrated circuit embedded therein.

20. The multi-layer card of claim 1, wherein the top surface and the bottom surface of the outer layer each comprise at least one of a graphic image, a numerical symbol, and a text symbol, and wherein the effects layer is visibly distinguishable from the two image planes provided by the top surface and the bottom surface of the outer layer.

21. A multi-layer card that meets ASO/ISO specifications, the multi-layer card comprising a bearing layer, the bearing layer comprising:

(a) a first core layer, wherein the first core layer is transparent or translucent;

(b) a second core layer; and (c) a visible effects layer disposed directly between the first core layer and the second core layer, wherein the visible effects layer comprises:

(i) an opaque substrate having a first surface; and (ii) a visible first material deposited over the first surface;

wherein the multi-layer card further comprises an outer layer disposed over the transparent or translucent first core layer, the outer layer being substantially transparent and comprising at least one of a graphic image, a numerical symbol, and a text symbol created on at least one of its top surface and its bottom surface, wherein the visible effects layer appears to be either below and/or on the same level as the graphic image, the numerical symbol and/or the text symbol.

22. A multi-layer card that meets ASO/ISO specifications, the multi-layer card comprising a bearing layer, the bearing layer comprising:

(a) a first core layer;

(b) a second core layer, wherein at least one of the first core layer and the second core layer is transparent or translucent; and (c) a visible effects layer disposed directly between the first core layer and the second core layer, wherein the visible effects layer comprises:

(i) a transparent or translucent substrate having a first surface; and (ii) a visible first material deposited over the first surface;

wherein the multi-layer card further comprises a first outer layer disposed over the first core layer and a second outer layer disposed over the second core layer, wherein one of the first outer layer and the second outer layer is opaque and the other of the first outer layer and the second outer layer is substantially transparent and comprises at least one of a graphic image, a numerical symbol, and a text symbol created on at least one of its top surface and its bottom surface, and wherein the visible effects layer appears to be either below and/or on the same level as the graphic image, the numerical symbol and/or the text symbol.

* * * * *